United States Patent Office 3,211,666
Patented Oct. 12, 1965

3,211,666
PHOSPHOR
William A. McAllister, Morris Township, Morris County, N.J., assignor to Westinghouse Electric Corporation, Pittsburgh, Pa., a corporation of Pennsylvania
No Drawing. Filed Feb. 18, 1963, Ser. No. 259,416
8 Claims. (Cl. 252—301.4)

This invention relates to phosphor material and, more particularly, to phosphor material which efficiently generates visible radiations of varying colors, depending upon the activator used.

Phosphors which will efficiently convert ultraviolet radiations into visible radiations are useful in fluorescent lamps. Phosphors which efficiently convert ultraviolet radiations into visible radiations at relatively high temperatures are also useful for color correcting the output of high-pressure, mercury-vapor lamps. Phosphors which convert cathode rays into visible radiations are useful for many different applications, such as television tubes.

Phosphors having spectral emissions that can be readily modified are especially useful since the emission color of the phosphor can be tailored for the intended application. Most phosphors will emit in the visible spectrum with a relatively broad or band-type of emission. Phosphors displaying a so-called line emission are desirable because of the modified spectral effects which can be obtained.

It is the general object of this invention to provide phosphor material which efficiently converts ultraviolet radiations or cathode rays into visible radiations.

It is another object to provide phosphor material which has good temperature-dependence characteristics.

It is a further object to provide phosphor material having an emission color which can be varied by varying the activator.

It is an additional object to provide phosphor material which emits visible radiations having a so-called line emission spectrum.

The aforesaid objects of the invention, and other objects which will become apparent as the description proceeds, are achieved by providing phosphor material having a lanthanum phosphate matrix. The phosphor is activated by terbium, eruopium, or mixtures thereof. A lithium activator desirably is used to supplement the rare-earth activator.

Example I

As a specific example, one mole of lanthanum oxide ($La_2O_3$) is mixed with two moles of ammonium dihydrogen orthophosphate, and 0.08 mole europium oxide ($Eu_2O_3$). These phosphor raw-mix constituents are thoroughly mixed, placed into a silica firing boat, and fired in a nitrogen atmosphere at a temperature of 1100° C. for a period of 1½ hours. The emission color of the phosphor when excited by 2537 A.U. is red, and when excited by 3650 A.U., the emission color is orange. This emission is in the form of a line spectrum, as contrasted to a continuous or band spectrum, and the primary emission lines are approximately as follows, as given in millimicrons: 530, 588, 592, 612 and 618. Under excitation by cathode rays, the emission color is comparable to that obtained when the phosphor is excited by 3650 A.U.

Example II

The foregoing phosphor can be modified with respect to its spectral emission by substituting a terbium activator for the europium activator. In preparing such a phosphor, terbium oxide ($Th_4O_7$) in amount of 0.04 mole is substituted for the europium oxide in the foregoing example. The phosphor raw mix is fired under the same conditions as specified in the previous example. The phosphor responds with a blue emission when excited by 2537 A.U., a green emission when excited by 3650 A.U., and the wavelengths of the primary emission lines, as given in millimicrons, are approximately as follows: 490, 540, 585 and 670. The phosphor is also responsive to cathode ray excitation and the emission under such excitation is similar to that obtained under 3650 A.U. excitation.

Example III

It is desirable to supplement the terbium or europium activators by addition of a lithium activator. In preparing such phosphor embodiments, lithium carbonate in amount of 0.08 mole is added to the raw mixes as given in Examples I and II. The phosphor raw mix is fired under conditions as specified in these examples. The addition of the lithium activator does not modify the emission characteristics of the phosphor, but the resulting products are more uniform with respect to their fluorescence.

The terbium and europium activators can be utilized together and the emission of the resulting phosphor will vary between that of the eruopium-activated embodiment and the terbium-activated embodiment, depending upon the relative proportions of the specified activators which are utilized.

The total amount of rare-earth activator in the phosphor should be such that the gram-atom ratio of such activator to phosphorus in the phosphor is from 0.01:1 to 0.16:1. The preferred rare-earth activator concentration is 0.08:1, as expressed in proportions of gram atoms of activator to gram atoms of phosphorus in the phosphor. The amount of lithium activator, if used, should be such that the gram-atom ratio of lithium to phosphorus in the phosphor is from 0.01:1 to 0.16:1, with the optimum lithium gram-atom ratio being 0.08:1.

The lanthanum phosphate matrix or host crystal can be modified by substituting strontium for a small portion of the lanthanum. This will not materially affect the emission characteristics of the phosphor. As an example, 0.3 mole of strontium oxide is substituted for 0.2 mole of lanthanum oxide, as given under Example I.

Some of the embodiments of the present phosphor have excellent temperature-dependence characteristics. For example, under the same excitation, the brightness of the terbium-activated phosphor at a temperature of 240° C. is approximately 90% of the room-temperature brightness of this phosphor. The temperature-dependence characteristics of the europium-activated phosphor are not quite as good as the terbium-activated phosphor, but are still fairly good.

It will be recognized that the objects of the invention have been achieved by providing phosphor material which efficiently generates visible radiations which can be varied with respect to color. The emission is a line spectrum. Some embodiments of the phosphor have very good temperature-dependence characteristics.

While best embodiments have been described hereinbefore, it is to be particularly understood that the invention is not limited thereto or thereby.

I claim as my invention:

1. A phosphor having a matrix consisting essentially of $LaPO_4$ and activated by one material of the group consisting of terbium, europium, terbium plus lithium, europium plus lithium, terbium plus europium, and terbium plus europium plus lithium, the gram-atom ratio of total rare-earth activator to phosphorus in said phosphor being from 0.01:1 to 0.16:1, and the gram-atom ratio of lithium activator to phosphorus in said phosphor being from 0.01:1 to 0.16:1.

2. The phosphor as specified in claim 1, wherein the gram-atom ratio of total rare earth activator to phosphorus in said phosphor is about 0.08:1, and the gram-atom ratio of lithium activator to phosphorus in said phosphor is about 0.08:1.

3. A phosphor having a matrix consisting essentially of $LaPO_4$ and including terbium as activator, and the gram-atom ratio of terbium to phosphorus in said phosphor being from 0.01:1 to 0.16:1.

4. A phosphor having a matrix consisting essentially of $LaPO_4$ and including europium as activator, and the gram-atom ratio of europium to phosphorus in said phosphor being from 0.01:1 to 0.16:1.

5. A phosphor having a matrix consisting essentially of $LaPO_4$ and activated by terbium plus lithium, the gram-atom ratio of terbium activator to phosphorus in said phosphor being from 0.01:1 to 0.16:1, and the gram-atom ratio of lithium activator to phosphorus in said phosphor being from 0.01:1 to 0.16:1.

6. A phosphor having a matrix consisting essentially of $LaPO_4$ and activated by europium plus lithium, the gram-atom ratio of europium activator to phosphorus in said phosphor being from 0.01:1 to 0.16:1 and the gram-atom ratio of lithium activator to phosphorus in said phosphor being from 0.01:1 to 0.16:1.

7. A phosphor having a matrix consisting essentially of $LaPO_4$ and activated by terbium plus europium, and the gram-atom ratio of total activator to phosphorus in said phosphor being from 0.01:1 to 0.16:1.

8. A phosphor having a matrix consisting essentially of $LaPO_4$ and activated by terbium plus europium plus lithium, the gram-atom ratio of total rare-earth activator to phosphorus in said phosphor being from 0.01:1 to 0.16:1, and the gram-atom ratio of lithium activator to phosphorus in said phosphor being from 0.01:1 to 0.16:1.

References Cited by the Examiner

UNITED STATES PATENTS

| | | | |
|---|---|---|---|
| 2,270,124 | 1/42 | Huniger et al. | 252—301.4 |
| 3,049,497 | 8/62 | Ranby et al. | 252—301.4 |

OTHER REFERENCES

Kroger, "Some Aspects of the Luminescence of Solids," Elsevier Publ. Co., Inc., New York, 1948, pages 262, 279, 282, 291 and 297.

TOBIAS E. LEVOW, *Primary Examiner.*

MAURICE A. BRINDISI, *Examiner.*